United States Patent [19]
Johnson

[11] 3,921,238
[45] Nov. 25, 1975

[54] DREDGE PIPE FLOTATION

[76] Inventor: Glenn Johnson, Box 344, Cambridge, Minn. 55008

[22] Filed: Sept. 6, 1974

[21] Appl. No.: 503,661

[52] U.S. Cl. .......................... 9/1 R; 37/72; 114/.5 F; 248/74 R
[51] Int. Cl.² .......................................... B63B 35/44
[58] Field of Search ....... 9/1 R, 8 R; 114/.5 F, .5 R; 37/72; 61/72.1, 72.2, 72.5; 248/49, 74 R, 74 B, 230

[56] References Cited
UNITED STATES PATENTS

| 1,821,320 | 9/1931 | Plummer | 114/.5 F |
| 3,060,463 | 10/1962 | Pentzien | 9/1 R |
| 3,286,286 | 11/1966 | Nelson | 9/1 R |
| 3,428,011 | 2/1969 | Motter | 9/1 R |

FOREIGN PATENTS OR APPLICATIONS

| 207,950 | 12/1923 | United Kingdom | 37/72 |

Primary Examiner—Trygve M. Blix
Assistant Examiner—Charles E. Frankfort
Attorney, Agent, or Firm—Leo Gregory

[57] ABSTRACT

A dredge pipe flotation device formed of a substantially hollow chambered body preferably formed of a material such as of fiberglass and having a concavity thereacross to partially receive a dredge pipe therein and having a pair of chains secured at either side of the concavity and having a locking device adjustably securing the chains about the pipe disposed in the concavity.

1 Claim, 4 Drawing Figures

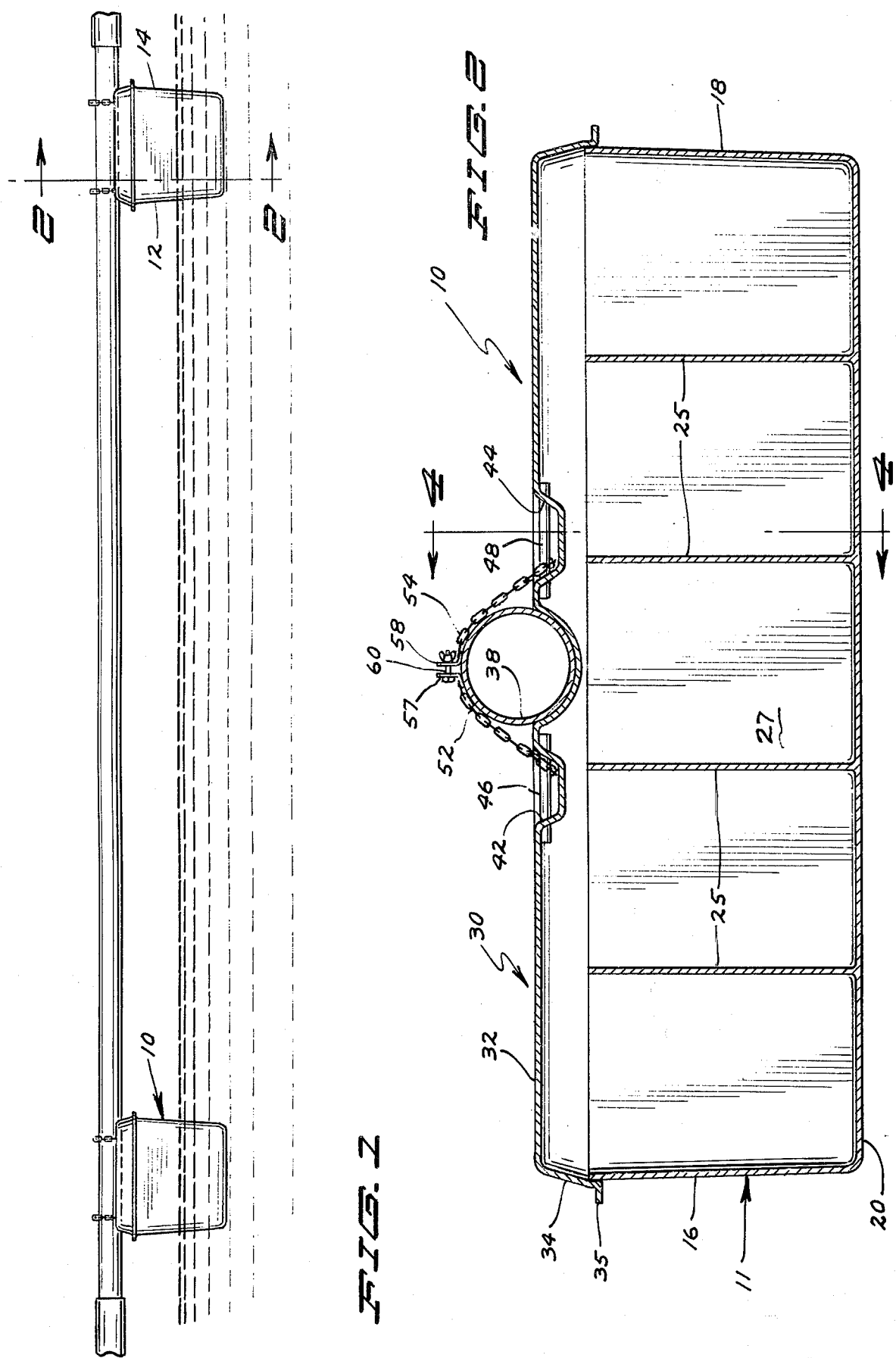

DREDGE PIPE FLOTATION

BACKGROUND AND SUMMARY OF THE INVENTION

The dredge pipe flotation device which is the subject matter of the invention herein is used in connection with dredging such as dredging shipping channels, lake and ocean harbors and the like. The material dredged up from the water bottoms is generally deposited on a land site and is conveyed thereto by a pipeline from the point of dredging. Said pipeline referred to herein as dredge pipe, will be made up of various lengths of pipe which may extend over a body of water for a considerable distance. Buoyant or flotation support is required for each length of pipe or for each point of linkage of connection of pipe.

It is appreciated that various constructions of flotation devices are known in the art. The structure herein provides improvement in being formed to have a relatively light weight for handling and shipping purposes, having great buoyancy or flotation capacity for support purposes and being adapted to be readily positioned or removed from position with respect to supporting a dredge pipe.

It is an object of this invention to provide a relatively large flotation member to support a substantial weight with said flotation member being made relatively simply and relatively inexpensive.

It is another object of this invention to provide a flotation device having a unitary shell construction comprising a plurality of air-tight chambers.

It is a further object of this invention to provide such a flotation device as above described, said flotation device having a concavity extending across the top portion thereof to partially receive a dredge pipe therein and having means at either side of said concavity to adjustably and releasably secure said pipe therein.

These and other objects and advantages of the invention will be set forth in the following description made in connection with the accompanying drawings in which like reference characters refer to similar parts throughout the several views and in which:

FIG. 1 is a broken view in plan showing the invention herein in operating position;

FIG. 2 is a view in vertical longitudinal section on an enlarged scale taken on line 2—2 of FIG. 1 as indicated;

DESCRIPTION OF A PREFERRED EMBODIMENT

Figure 3:
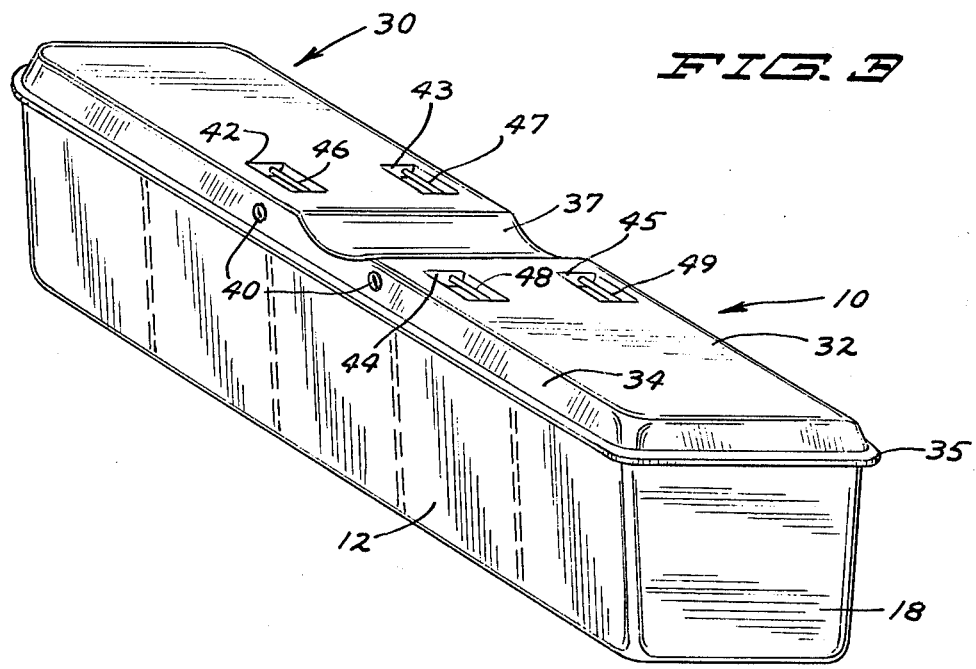
FIG. 3 is a view in perspective.
Figure 4:
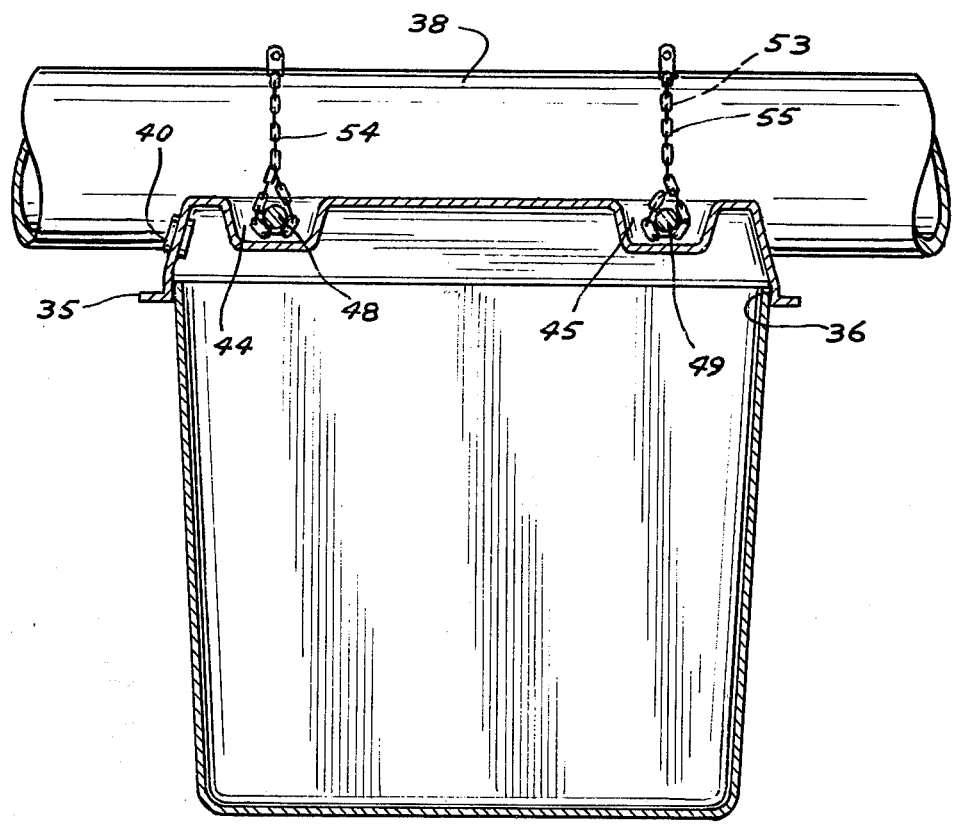
FIG. 4 is a view in vertical cross section taken on line 4—4 of FIG. 2 as indicated and having portions thereof broken away.

Referring to the drawings, a dredge pipe flotation device or member 10 is shown and is here illustrated as being substantially parallelepiped in form having a lower body portion 11 comprising side walls 12 and 14, end walls 16 and 18 and a bottom wall 20.

Said lower body portion is formed as on a mold and is here indicated as being very suitably made of a fiberglass material providing a strong, rigid, relatively thin wall construction.

Said body portion for overall rigidity has a plurality of transverse plate or baffle members 25 extending across the interior thereof forming a plurality of chambers 27.

Overlying said body portion 11 is an upper body or cover portion 30 having a top wall 32 and a peripheral wall 34 thereabout shown here inclined downwardly with a small transverse radius and having an outwardly extending peripheral flange 35 whereby said top cover portion seats over and overlies the upper edge portion of said lower body portion 11 and said cover portion may be permanently secured in said position at the overlapping portions thereof as shown as by the use of a suitable adhesive 36.

Extending centrally transversely of said cover portion 30 is a concave portion 37 forming an open top channel to receive partially therein a pipe 38, said pipe being representative of a pipeline to convey dredged material.

Shown here adjacent either side of said channel 37 extending through and secured in said side wall are removable plugs 40 for the removal of condensation from within said chambers 27.

Formed in said top cover portion 30 at either side of said channel 37 are transversely spaced pairs of recesses 42, 43 and 44, 45 formed into said cover portion and shown here to be rectangular in plan.

Extending respectively across the upper portion of each of said recesses which are here shown to be longitudinal of said cover portion and extending through the adjacent cover portions are holding pins 46–49.

Respectively secured to said pins are holding means 52–55 shown here in the form of link chains with each having an angled apertured bracket such as the brackets 57 and 58 which are shown. Wing nutted bolts 60 extend through opposed pairs of said brackets to couple opposed pairs of said chains about a pipe disposed through said channel as illustrated in FIG. 2. Said chains are readily secured to said pins as by having a terminal portion disposed thereabout and secured by a split locking link in a conventional manner.

OPERATION

The operation of the flotation device above described is believed to be clear in view of the description given.

One of said flotation devices will support each end portion of a pipe length as indicated in FIG. 1. The concave portion 37 of each of said devices very nicely accommodates a portion of a dredge pipe therein. The pairs of chain members 52, 54 and 53, 55 are readily positioned about a pipe portion and are hand secured by extending the wing nutted bolts through the respective pairs of bracket plates carried at the adjacent ends of said chains.

Hence, the installation and removal of said flotation devices is readily accomplished. The device is relatively light weight and easily handled and represents a substantial improvement in the art.

It will of course be understood that various changes may be made in form, details, arrangement and proportions of the parts without departing from the scope of the invention herein which, generally stated, consists in an apparatus capable of carrying out the objects above set forth, in the parts and combinations of parts disclosed and defined in the appended claims.

What is claimed is:

1. A dredge pipe flotation device, having in combination
an enclosed flotation member forming a chambered hollow body portion, a cover portion overlying said body portion and having an open top channel extending thereacross, a pair of spaced recesses at one side of said channel and an opposed pair of like recesses at the other side of said channel, a pin member intersecting each of said recesses extending thereacross and being secured therein, chain members each having an end portion secured to one of said pin members, and means removable securing the corresponding pairs of the opposed other end portions of said chain members.

* * * * *